Sept. 24, 1957  J. P. CORBETT ET AL  2,807,763
SERVO CONTROL SYSTEMS
Filed April 18, 1955  3 Sheets-Sheet 1

Sept. 24, 1957     J. P. CORBETT ET AL     2,807,763

SERVO CONTROL SYSTEMS

Filed April 18, 1955     3 Sheets-Sheet 2

United States Patent Office 2,807,763
Patented Sept. 24, 1957

2,807,763

SERVO CONTROL SYSTEMS

James Patrick Corbett, Robert William Sutton, and Reginald Donahoe Ball, Stafford, England, assignors to The English Electric Company Limited, London, England, a British company Application April 18, 1955, Serial No. 502,144

Claims priority, application Great Britain April 30, 1954

5 Claims. (Cl. 318—28)

This invention relates to servo control systems which incorporate A. C. servo motors.

According to the invention, a closed loop position control servo system comprises a single phase A. C. servo motor arranged to drive an output shaft, error-detecting means responsive to a controlling element and to the actual position of said output shaft for producing an output quantity which is a measure of the position error of said shaft, amplifier means responsive to this quantity and arranged to provide as output the electrical power required to energise the motor, and a non-linear circuit element connected in the servo loop between the error-detecting means and the motor and serving to cause the energizing signal applied to the motor to be a non-linear function of the error quantity in such a way that the ratio, energizing signal/error quantity, decreases as the error quantity increases.

Preferably, said non-linear circuit element has an impedance characteristic which causes said energizing signal to vary approximately in proportion to the square root of said error quantity.

According to a feature of the invention, said non-linear circuit element comprises two dry plate rectifiers connected in reverse parallel and arranged so as to form a shunt path for signals passing around the loop.

The non-linear circuit element may have an impedance characteristic which is adapted by the addition of resistors and bias means to said dry plate rectifiers to cause said impedance characteristic to be such that said energizing signal varies approximately in proportion to the square root of said error quantity.

According to another feature of the invention, the closed loop position control servo system comprises a single phase A. C. servo motor arranged to drive an output shaft, a controlling element comprising a coarse control input shaft and a fine control input shaft geared together to provide a coarse and fine control means, two error-detecting means each responsive to the position of a different input shaft and the actual position of said output shaft and serving to produce output quantities which are measures of the position error of said output shaft, a non-linear circuit element connected in the servo loop between the error-detecting means responsive to the position of the fine control input shaft and an amplifier, said amplifier being responsive to the output quantities of both said non-linear circuit element and the error-detecting means responsive to the position of the coarse control input shaft, the non-linear circuit element being adapted to cause the energizing signal applied to the motor to be a non-linear function of the error quantity derived in response to an adjustment of the fine control input shaft in such a way that the ratio, energizing signal/error quantity, decreases as the error quantity increases and, as a result, for large error quantities the fine control is relatively less sensitive than the coarse control whereas for small error quantities the fine control become relatively more sensitive than the coarse control.

In order that the invention may be well understood the above and further features will now be described with reference to the accompanying drawings.

Figure 3:
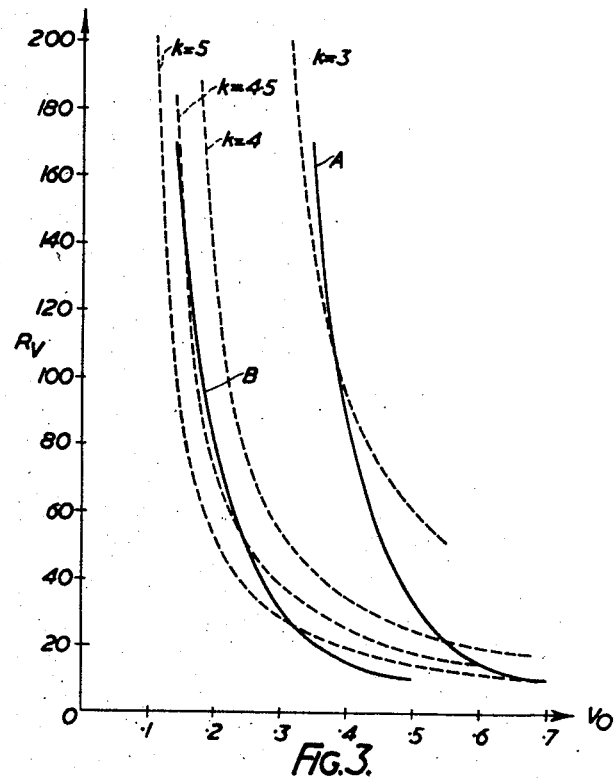
Figure 4:
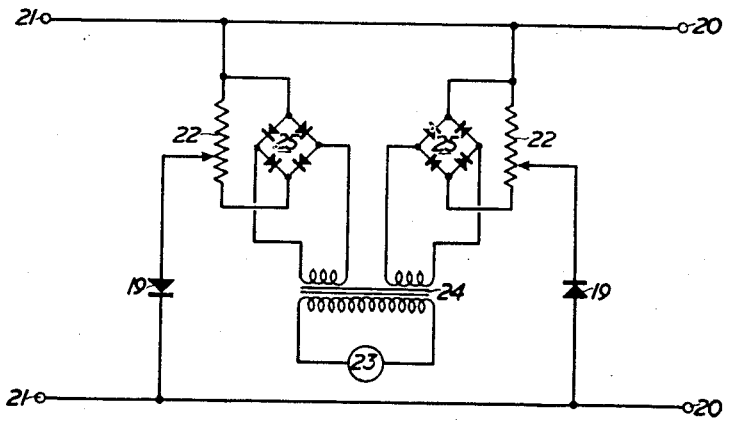
Figure 5:
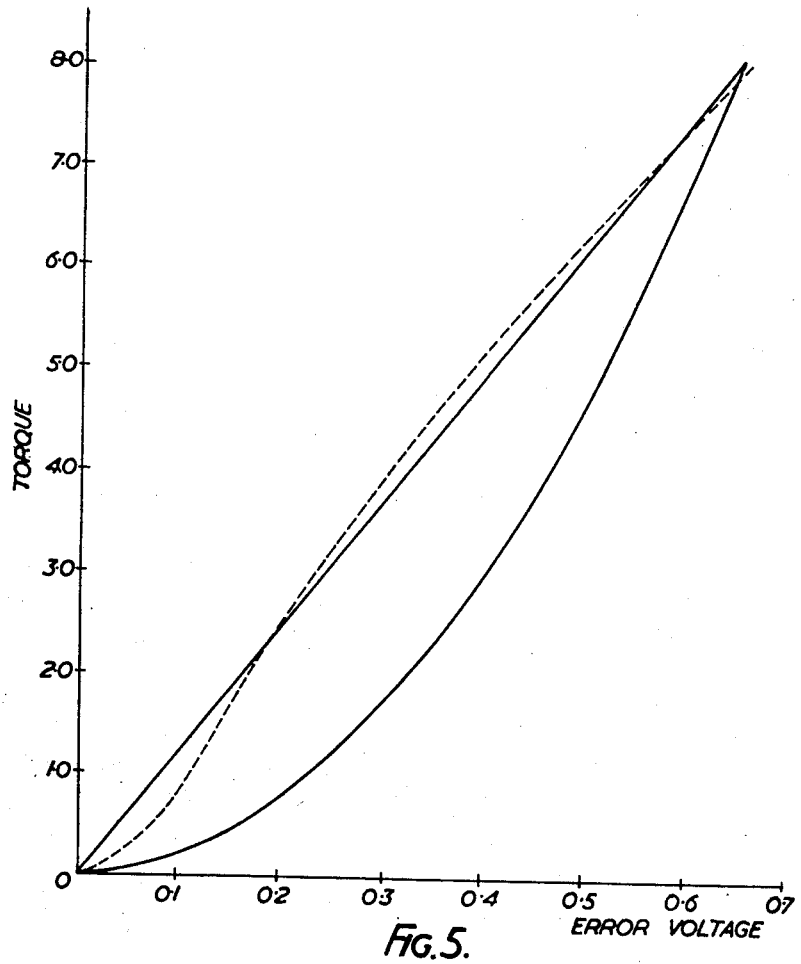
Figure 6:
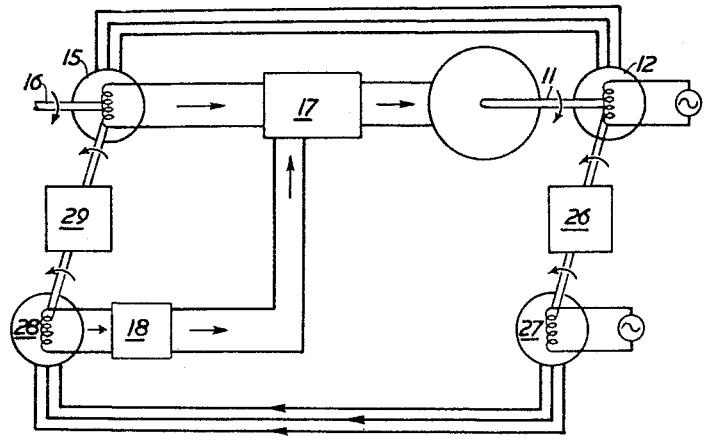
Figure 7:
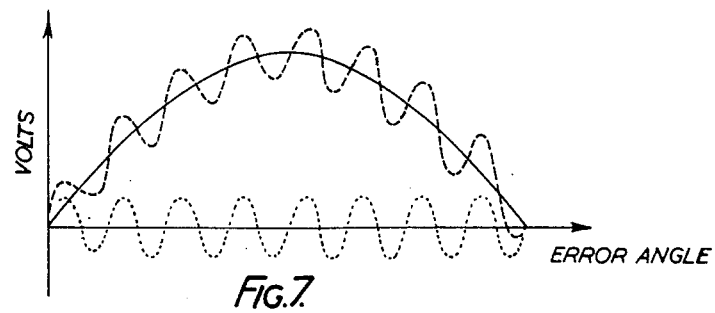
Figure 8:
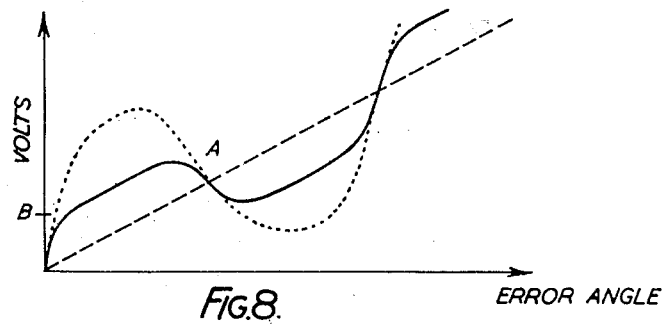

Fig. 3 shows the required relationship between the response of a rectifier and the voltage applied to it, this being compared with the required characteristic, Fig. 4 shows a non-linear element incorporating rectifiers and a bias system, Fig. 5 shows an actual operating characteristic of a servo-mechanism according to the invention as compared with an ideal characteristic and one which would be obtained by a conventional method, Fig. 6 shows a servo-mechanism according to the invention having coarse and fine controls, Fig. 7 shows signal wave-forms applicable to the servo-mechanism of Fig. 6 when the features afforded by the invention are not present, and Fig. 8 shows wave-forms corresponding to Fig. 7 when the features embodied in the invention are incorporated in the servo-mechanism as shown in Fig. 6.

Figure 1:
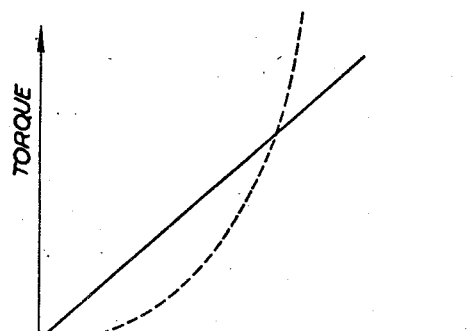
Fig. 1 shows the relationship between torque and error signal for a servo system.

If in a servo control system an A. C. servo motor is arranged to have no standing losses the motor torque will be proportional to the square of the energization voltage and in the normal system in which this voltage is proportional to the error signal there will be a non-linear relationship between the motor torque and the error signal which will have a form somewhat the same as that shown in Fig. 1 by the broken curve. Such a relationship is an undesirable one since it corresponds to a weak sensitivity and response at small error signals, and a linear relationship such as that shown by the full line in Fig. 1 is preferred. A linear relationship between torque and error may be obtained by having large standing currents in the motor phases but these result in considerable standing losses and heating of the motor. Hence, if large standing losses in the servo motor are to be avoided at small error signals and the linear relationship is to be obtained means must be provided for rendering the energization voltage proportional to the square root of the error signal.

Figure 2:
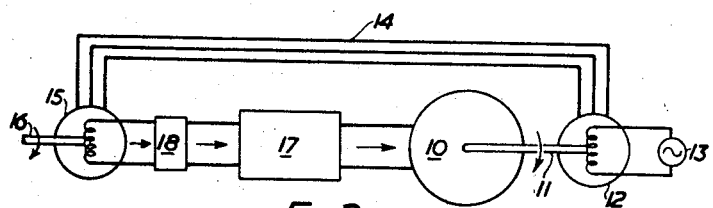
Fig. 2 shows schematically a servo-mechanism incorporating the invention.

Referring to Fig. 2, a conventional transmitter-resetter magslip pair as used in a position control servo system is shown. A servo motor 10 drives an output shaft 11 which is coupled to a transmitter magslip 12 energized from an electrical source 13. The output of the magslip 12 is fed by the leads 14 to the resetter magslip 15 having an input shaft 16. The output signal from the resetter magslip 15 is fed to an amplifier 17 and the amplifier energizes the motor 10. The output signal from the magslip 15 is the error signal and the supply to motor 10 is the energization voltage mentioned above. To introduce a non-linear relationship between these the characteristic of the amplifier 17 may be rendered non-linear or an element for this purpose may be introduced between the magslip 15 and amplifier 17 or between the amplifier 17 and motor 10. Of these three, the element 18 shown in Fig. 2 lies between the magslip 15 and the amplifier 17 but it will be appreciated that an element having a similar function can readily be introduced at the output stage of the amplifier or at an intermediate stage in the amplifier.

The function of the non-linear element 18 is to afford an output signal which will be proportional to the square root of the input. The equation relating the output, say $V_o$, and the input, say $V_i$, may be written in the form:

$$kV_o = \sqrt{V_i}$$

where $k$ is a constant of proportionality. On differentiating this equation the gain G required of this non-linear element 18 is seen to be:

$$G=\frac{dV_o}{dV_i}=\frac{1}{2k\sqrt{V_i}}$$

The gain required is very large for small input voltages, being infinite when the input voltage is zero and decreasing according to the equation above as the input voltage increases.

Since it is impossible in practice to achieve an infinite gain there will always be deviations from the true square root characteristic for very small input voltages. The requirements of the non-linear element are that the resistance of the element shall decrease as the signal voltage increases and preferably can be caused to correspond approximately to the above equation by introducing resistors for the purpose of matching the system to a particular load. Also since the resistance of the non-linear element may be adjusted by a suitable standing bias voltage in the system a further variable to assure matching is available. Perfect matching is not possible in practice but reasonable approximations to the required characteristic can be obtained.

Calling $R_L$ the resistance of the load, $R_V$ the resistance of the non-linear element, $R_L$ and $R_V$ being connected in parallel, and also calling the internal impedance of the source energizing these $R_s$ then the relationship between $R_V$, $R_s$ and $R_L$ is required to have the following form in order that the relationship between $V_o$ and $V_i$ shall have the form given above:

$$\frac{R_v}{R_s}\left(1+\frac{R_s}{R_L}\right)=\frac{1}{\frac{k^2 V_o}{\left(1+\frac{R_s}{R_L}\right)}-1}$$

In Fig. 3 the theoretical characteristics corresponding to the above equation are shown for a series of values of $k$. Also shown, denoted by A, is the actual characteristic relating the resistance of a selenium rectifier and the voltage across the rectifier. Further, denoted by B, is the corresponding characteristic of the same rectifier with a bias voltage superimposed across it to bring the characteristic into a more suitable operating range.

It may be found in practice that it is necessary to incorporate the non-linear element between a pre-amplifier and an amplifier in order to raise the level of the input voltage across the non-linear element to a suitable value. For example, restrictions which arise when designing such a system may be that the impedance of the source is fixed when the load is fixed to give maximum power transfer in the absence of the non-linear element, and the output of the resetter magslip may be limited to a value of open circuit volts per degree of misalignment. These restrictions govern the required value of the impedance range of the non-linear element and since this impedance is a function of voltage the restrictions can well lead to the need for a pre-amplifier.

Whether or not a pre-amplifier is necessary depends upon the type of non-linear element chosen and on the voltage range required.

Fig. 4 shows a non-linear circuit element suitable for use as the element 18 in Fig. 2. The element comprises two half-wave dry plate rectifiers 19 which are connected in a reverse parallel manner across the output terminals 20 and the input terminals 21 of the element. In order to introduce a bias potential in series with each of the rectifiers the potentiometers 22 are provided. These potentiometers are energised from an A. C. source 23 through transformer 24 and full-wave bridge rectifiers 25. The transformer 24 has two secondary windings of equal size supplying the bridge rectifiers 25 and the arrangement is such that the bias voltages, which are applied to the rectifiers 19 as potential drops in the potentiometers 22, bias the rectifiers towards the conducting condition and can be adjusted so that the whole non-linear element has an impedance that is independent of the polarity of the input signal applied between the terminals 21. As will be understood from the foregoing mathematical analysis, when the element is used in a circuit such as that shown in Fig. 2 its performance is dependent upon the resistance of a load to be connected between the output terminals 20 and the internal resistance of a signal source to be connected between the input terminals 21.

When a system such as that described above is used in practice it is possible to obtain a torque versus error characteristic for the servo-mechanism which is reasonably linear.

In Fig. 5 the broken line shows an actual torque-error relationship which has been obtained in a servo-mechanism incorporating a non-linear rectifier type element suitably matched. The two full lines show the ideal characteristic, that is the linear relationship between torque and error, and the one which would correspond if a linear element were incorporated instead of a non-linear element, that is one in which the torque is proportional to the square of the error.

A more sensitive system results if additional magslips are geared, through step-up gear boxes, to the transmitter-resetter magslips. Such an arrangement is shown in Fig. 6. The transmitter 12 is connected through a gear box 26 to a further magslip 27. Magslip 27 is connected electrically to a similar magslip 28 which is connected via gear box 29 to resetter magslip 15. In this case the output from magslip 28 is connected through the non-linear element 18 to the amplifier 17 and the output from the magslip 15 is connected directly as an input to amplifier 17. Gear ratios of gear boxes 26 and 29 are equal and such that the magslips 27 and 28 function as a fine control and magslips 12 and 15 function as a coarse control. With such a system the stabilized operation of the servo-mechanism will be mainly governed by a signal passing through the non-linear element since the output from the fine control resetter magslip will, for a given misalignment of the output and input shafts 11 and 16 respectively, be substantially greater than the output signal from the coarse control resetter magslip 15. For a large misalignment the coarse control magslips will exert the main control over the operation of the servo system and under certain conditions undesirable operation of the system can result unless a suitable precaution is taken. Consider, for example, Fig. 7.

In Fig. 7 the output signals of the two resetter magslips 15 and 28 are shown respectively by the full and dotted curves as functions of the error angle of the servo-mechanism. It is presumed that the fine control magslip has a lower peak output voltage than the coarse control maglsip. The wave-form shown corresponds to the servo-mechanism having a gear ratio between the curves and the fine control of 16:1. If the amplifier is made to respond to an input signal which is the sum of the two signals derived from the resetter magslips then the input to the amplifier will have the form of the broken curve shown in Fig. 7. Such a curve suffers from the disadvantage that parts of it indicate an increasing error angle with a decreasing voltage whereas other parts correspond to an increasing angle and an increasing voltage. Consequently it is possible for the system to have an erroneous position under certain conditions and instead of settling at the position corresponding to zero misalignment between the output and input shafts it may well settle down at some fixed misalignment or hunt about this position. Whether or not it does this is dependent upon the relative amplitudes of the coarse and fine error signals. As will be seen from Fig. 8, if the dotted curve had a greater amplitude it might cross the abscissa and the sign of the ratio of error voltage and error angle would reverse. A known way of overcoming this idfficulty is to cause the input signal to the amplifier from the fine control resetter magslip 28 to be switched off by some relay means if the output from the magslip exceeds the fixed amount so that in the event of a large misalignment the coarse control magslip alone covers the servo operation until such time as the misalignment has been sufficiently reduced to cause a stable operation from the combined signals. With the system shown in Fig. 6, using the non-linear element 18, it is possible to limit or reduce the output from the non-linear element for the larger values of misalignment. This gives the system a high degree of sensitivity for low error signals. By a suitable choice of non-linear element and circuit parameters the total input signal of the amplifiers can be made to approximate to the square root law for such small values of misalignment. Also, when the misalignment becomes greater the relative sensitivities of the coarse and fine controls are adjusted so that the servo-mechanism tends to respond more to the coarse control magslip output. With such a system the combined input signal to the amplifier can have the form shown in Fig. 8, the sine wave outputs of the two magslips being shown, the output from the coarse control resetter magslip shown by the broken curve and the output from the fine control resetter magslip when superimposed on the output from the coarse control magslip being shown by the dotted curve. This full curve shows how the non-linear element flattens the output from the fine control resetter magslip. It is advantageous to cause some element to saturate so that the combined signal cannot rise above a value denoted by B, say, in Fig. 8. Such a saturation can be caused by some feature in the amplifier or it may be caused by adding the two signals by transformer means and designing the transformer so that it saturates at a suitable value. Whereas in the above description the non-linear element has been referred to as a rectifier system the scope of the invention extends to other forms of non-linear element.

Also, whereas in the above-described embodiments it has been assumed that a linear torque versus error signal is desirable it is conceivable that other forms of torque versus error signal characteristics may be required. The invention may find application in such cases.

What we claim as our invention and desire to secure by Letters Patent is:

1. A closed-loop position control servo system comprising a single-phase A. C. servo motor arranged to drive an output shaft, error-detecting means responsive to a controlling element and to the actual position of said output shaft for producing an output quantity which is a measure of the position error of said shaft, amplifier means responsive to this quantity and arranged to provide as output the electrical power required to energize the motor, and a non-linear circuit element connected in the servo loop between the error detecting means and the motor and serving to cause the energizing signal applied to the motor to be a non-linear function of the error quantity in such a way that the ratio, energizing signal/error quantity, decreases as the error quantity increases.

2. A closed-loop position control servo system according to claim 1, wherein said non-linear circuit element has an impedance characteristic which causes said energizing signal to vary approximately in proportion to the square root of said error quantity.

3. A closed-loop position control servo system according to claim 1, wherein said non-linear circuit element comprises two dry plate rectifiers connected in reverse parallel and arranged so as to form a shunt path for signals passing around the loop.

4. A closed-loop position control servo system according to claim 3, wherein said non-linear circuit element has an impedance characteristic which is adapted by the addition of resistors and bias means to said dry plate rectifiers to cause said impedance characteristic to be such that said energizing signal varies approximately in proportion to the square root of said error quantity.

5. A closed-loop position control servo system comprising a single-phase A. C. servo motor arranged to drive an output shaft, a controlling element comprising a coarse control input shaft and a fine control input shaft geared together to provide a coarse and fine control means, two error-detecting means each responsive to the position of a different input shaft and the actual position of said output shaft and serving to produce output quantities which are measures of the position error of said output shaft, a non-linear circuit element connected in the servo loop between the error detecting means responsive to the position of the fine control input shaft and an amplifier, said amplifier being responsive to the output quantities of both said non-linear circuit element and the error-detecting means responsive to the position of the coarse control input shaft, the non-linear circuit element being adapted to cause the energizing signal applied to the motor to be a non-linear function of the error quantity derived in response to an adjustment of the fine control input shaft in such a way that the ratio, energizing signal/error quantity, decreases as the error quantity increases and, as a result, for large error quantities the fine control is relatively less sensitive than the coarse control whereas for small error quantities the fine control becomes relatively more sensitive than the coarse control.

References Cited in the file of this patent

UNITED STATES PATENTS 2,593,950    Williams _____ Apr. 22, 1952